(12) United States Patent    (10) Patent No.: US 7,683,665 B1
Fritz et al.    (45) Date of Patent: Mar. 23, 2010

(54) MULTIPLE PARALLEL PROGRAMMABLE FINITE STATE MACHINES USING A SHARED TRANSITION TABLE

(75) Inventors: Rolf Fritz, Waldenbuch (DE); Ulrich Mayer, Weil im Schoenbuch (DE); Thomas Schlipf, Holzgerlingen (DE); Christopher S Smith, Tamm (DE)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/427,559

(22) Filed: Apr. 21, 2009

(51) Int. Cl.
 *H03K 19/173* (2006.01)
(52) U.S. Cl. .......................... 326/38; 326/46
(58) Field of Classification Search ............. 326/37–41, 326/46, 47
 See application file for complete search history.

(56) References Cited

U.S. PATENT DOCUMENTS

| | | | |
|---|---|---|---|
| 4,707,825 A | 11/1987 | Amstutz et al. | |
| 5,121,390 A | 6/1992 | Farrell et al. | |
| 5,724,352 A | 3/1998 | Cloonan et al. | |
| 5,774,461 A | 6/1998 | Hyden et al. | |
| 6,101,589 A | 8/2000 | Fuhrmann et al. | |
| 6,900,661 B2 * | 5/2005 | Schlipf | 326/46 |
| 6,931,023 B2 | 8/2005 | Lin et al. | |
| 7,173,452 B2 * | 2/2007 | Folsom | 326/46 |
| 7,305,635 B1 | 12/2007 | Abramovici et al. | |
| 7,360,076 B2 | 4/2008 | Anand et al. | |
| 7,429,870 B2 * | 9/2008 | Kelem et al. | 326/9 |
| 2001/0043603 A1 | 11/2001 | Yu | |
| 2004/0190632 A1 | 9/2004 | Cismas | |
| 2005/0204111 A1 | 9/2005 | Natarajan | |
| 2008/0126749 A1 | 5/2008 | Tom et al. | |

OTHER PUBLICATIONS

Piyachon, Piti and Yan Luo. "Compact State Machines for High Performance Pattern Matching." *DAC* 2007, Jun. 4-8, 2007. San Diego, USA.

* cited by examiner

*Primary Examiner*—James Cho
(74) *Attorney, Agent, or Firm*—McGinn IP Law Group, PLLC

(57) ABSTRACT

A system and method of implementing multiple programmable finite state machines using a shared transition table is disclosed, the method including forming a plurality of finite state machine cores such that an amount of the plurality of finite state machine cores is unchangeable, forming a state transition array, and forming a routing network such that the forming the plurality of associated state transition elements is realized.

1 Claim, 13 Drawing Sheets

MULTIPLE PARALLEL PROGRAMMABLE FINITE STATE MACHINES USING A SHARED TRANSITION TABLE

BACKGROUND OF THE INVENTION

1. Field of the Invention

The present invention generally relates to programmable finite state machines, and more specifically to a system and method of arranging multiple parallel programmable finite state machines using a shared transition table for finite state machine storage.

2. Description of the Related Art

Digital designs are typically partitioned into a data flow component and a control component. The control component is implemented using a set of finite state machines. Finite state machines are sequential in nature and progress from an initial state through a series of states in order to fulfill a certain task. The data flow component returns decision signals to the control component. Then, based on the decision signals returned from the data component, the control component decides the further steps that should be taken.

FIG. 1 illustrates a structure of a conventional finite state machine, including a core finite state machine logic area 1, a current state register 2 containing a current state, and an input register 3 containing an input vector. The core finite state machine logic area 1 calculates the next state 4 and the output 5.

FIG. 2 illustrates a conventional state transition table of a conventional finite state machine. A state transition table of a finite state machine specifies or defines the finite state machine. The current state, input vector, output vector, and next state are described by the state transition table illustrated in FIG. 2. The input vector (IV), output vector (OV), and next state (NS) describe the content of a single state transition element (STE). The values illustrated in FIG. 2 for IV and OV are representative of bit patterns. There are five transitions in the state transition table illustrated in FIG. 2. State S1 contains 3 STEs and State S2 contains 2 STEs.

FIG. 3 illustrates a conventional programmable finite state machine, which includes a finite state machine 31 and a storage 30. The storage 30 contains state machine transition information similar to the information illustrated in FIG. 2 and is used to program the finite state machine 31. The finite state machine 31 takes various inputs, including those emanating from the storage 30, and calculates the output vector to be output from the finite state machine core 31 and the next state to be output to the storage 30.

However, the conventional programmable finite state machine illustrated in FIG. 3 is not preferable due to the prohibitive cost of solely dedicating a storage unit to a programmable finite state machine. Since a semiconductor typically requires the implementation of multiple finite state machines, it would be advantageous for the implemented finite state machines to share storage units in order to optimize performance and cost.

FIG. 4 illustrates a conventional arrangement of multiple programmable finite state machines 41 utilizing a single multiport array storage unit 40. Multiple programmable finite state machines 41, up to an amount n, simultaneously make calls and access the single multiport array storage unit 40 for programming purposes.

FIG. 5 illustrates a conventional single programmable finite state machine including a state transition array (STA) 50. The STA 50 is organized such that each row contains all of the state machine transitions of a single state. In other words, one row of the STA 50 provides all of the STEs of a state. The state value in the current state register 2 is used as an index into the STA 50.

The programmable finite state machine 51 includes input vector match logic and output/next state select logic. The input vector match logic of the programmable finite state machine 51 compares all of the input vectors of the different STEs with the input comparators fed to the programmable finite state machine 51 and searches for an STE match. One of these comparators will have an STE match, which is represented by a comparator output of "1". All other comparators will not have an STE match and are represented by the comparator output of "0". The comparator that has the STE match controls the output/next state select logic.

When the STE match is found, the input vector match logic selects the matched STE and outputs the result to the output/next state select logic. Then, the output/next state select logic selects the comparator output of "1". The output/next state select logic then drives the output vector value of the selected STE to the data flow output and the next state value 4 of the selected STE to the current state register 2 as control input.

When multiple programmable finite state machines are sharing a single multiport array storage unit, the single multiport array storage unit must have an equal amount of ports to the number of programmable finite state machines. However, due to the large amount of programmable finite state machines required in a single application, this conventional arrangement is no longer practical due to the number of ports that necessarily must equal the amount of programmable finite state machines. Multiport arrays typically are less than preferable if referenced by a number of programmable finite state machines exceeding three or four.

Thus, it is desirable not only for individual finite state machines to be programmable, but also for different applications executed on the same finite state machines to share the same transition table. It is also desirable for an STA to be much larger than the conventional STA.

SUMMARY OF THE INVENTION

In view of the foregoing and other exemplary problems, drawbacks, and disadvantages of the conventional methods and structures, an exemplary object of the present invention is to provide a system and method of implementing multiple programmable finite state machines using a shared transition table.

An exemplary embodiment of the present invention includes a method of implementing multiple programmable finite state machines using a shared transition table, the method including forming a plurality of finite state machine cores such that an amount of the plurality of finite state machine cores is unchangeable, forming a state transition array, including forming a plurality of state transition elements such that an amount of the plurality of state transition elements assigned to one of the plurality of finite state machine cores and to one of a plurality of states is adjustable, the forming the plurality of state transition elements including forming a plurality of associated state transition elements such that the plurality of associated state transition elements are associated with the plurality of finite state machine cores, the forming the plurality of associated state transition elements including assigning the amount of the plurality of state transition elements to the one of the plurality of finite state machine cores and to the one of the plurality of states, and forming a plurality of free state transition elements not assigned to the plurality of finite state machine cores, and forming a routing network such that the forming the plurality of associated state transition elements is realized, the forming the routing network including forming a plurality of compartmented multiplexors dedicated to a plurality of compartments, the plurality of compartments including the plurality of state transition elements, forming a current state register to control a usage of the plurality of compartmented multiplexors with respect to the plurality of compartments, connecting the plurality of the compartments to a plurality of corresponding mux-levels of the plurality of compartmented multiplexors, and providing a start base address to specify a starting one of the plurality of corresponding mux-levels for one of the plurality of compartments such that an overlapping of the plurality of corresponding mux-levels is prevented. The amount of the plurality of finite state machine cores is equal to or greater than a number of the plurality of finite state machine cores associated with the plurality of associated state transition elements. The one of the plurality of compartments has a number of state transition elements that is equal to a number of comparators in a finite state machine core associated with the one of the plurality of compartments. An amount of the plurality of compartmented multiplexors equals the amount of the plurality of finite state machine cores. A number of the plurality of corresponding mux-levels in an entirety of the plurality of compartmented multiplexors is not utilized. The plurality of corresponding mux-levels is utilized in at least one of the compartmented multiplexors.

In the exemplary embodiment of the present invention, a state transition array is implemented that is much wider than the conventional state transition array. The state transition array can be programmed with state transition elements for all finite state machine cores being used. A routing network is also provided such that the association between the state transition array and the finite state machine cores is realized. Thus, the finite state machine cores are programmable for different applications while sharing the same transition table with a state transition array much larger than the conventional state transition array.

BRIEF DESCRIPTION OF THE DRAWINGS

The foregoing and other exemplary purposes, aspects and advantages will be better understood from the following detailed description of exemplary embodiments of the invention with reference to the drawings, in which.

DETAILED DESCRIPTION OF EXEMPLARY EMBODIMENTS OF THE INVENTION

Figure 1:
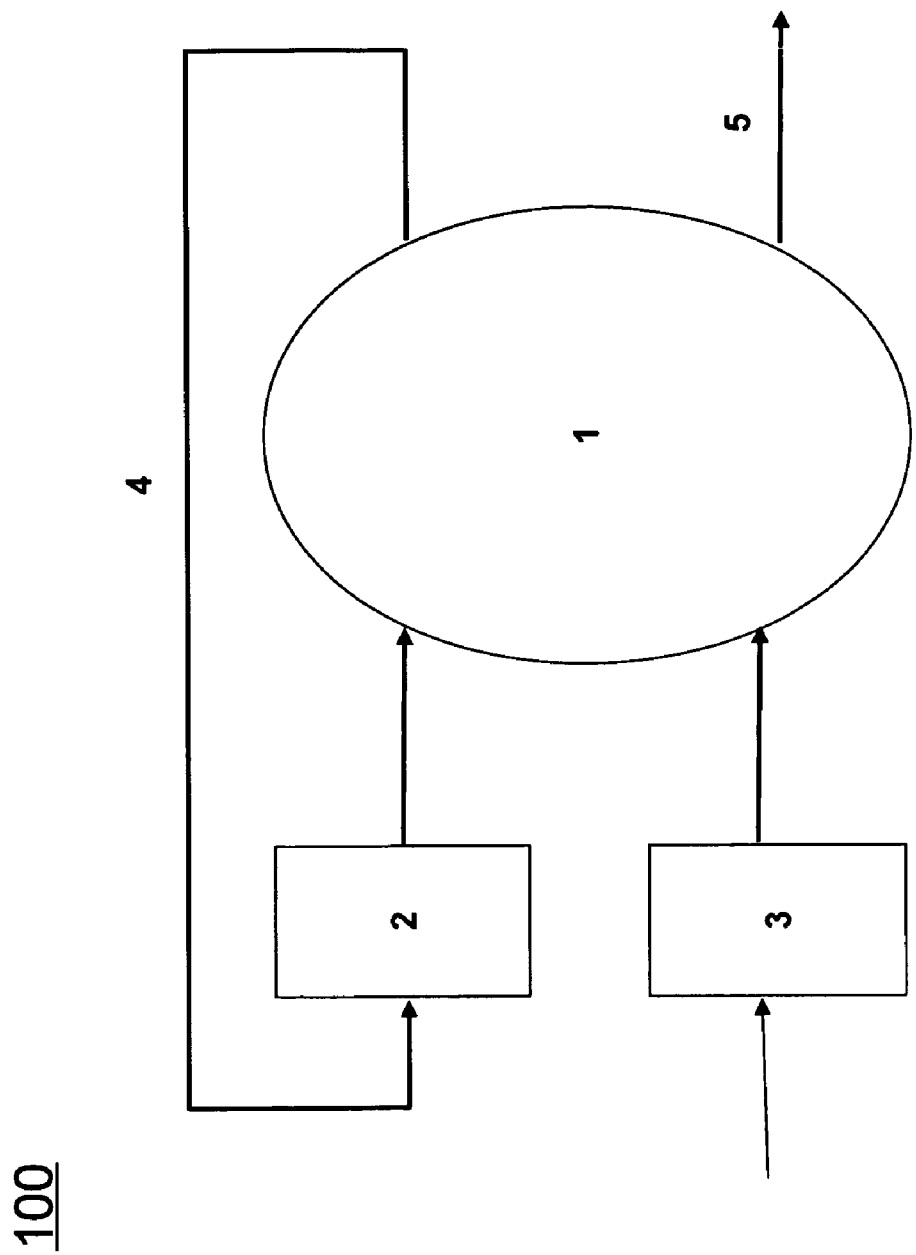
FIG. 1 illustrates a structure of a conventional finite state machine.
Figure 2:
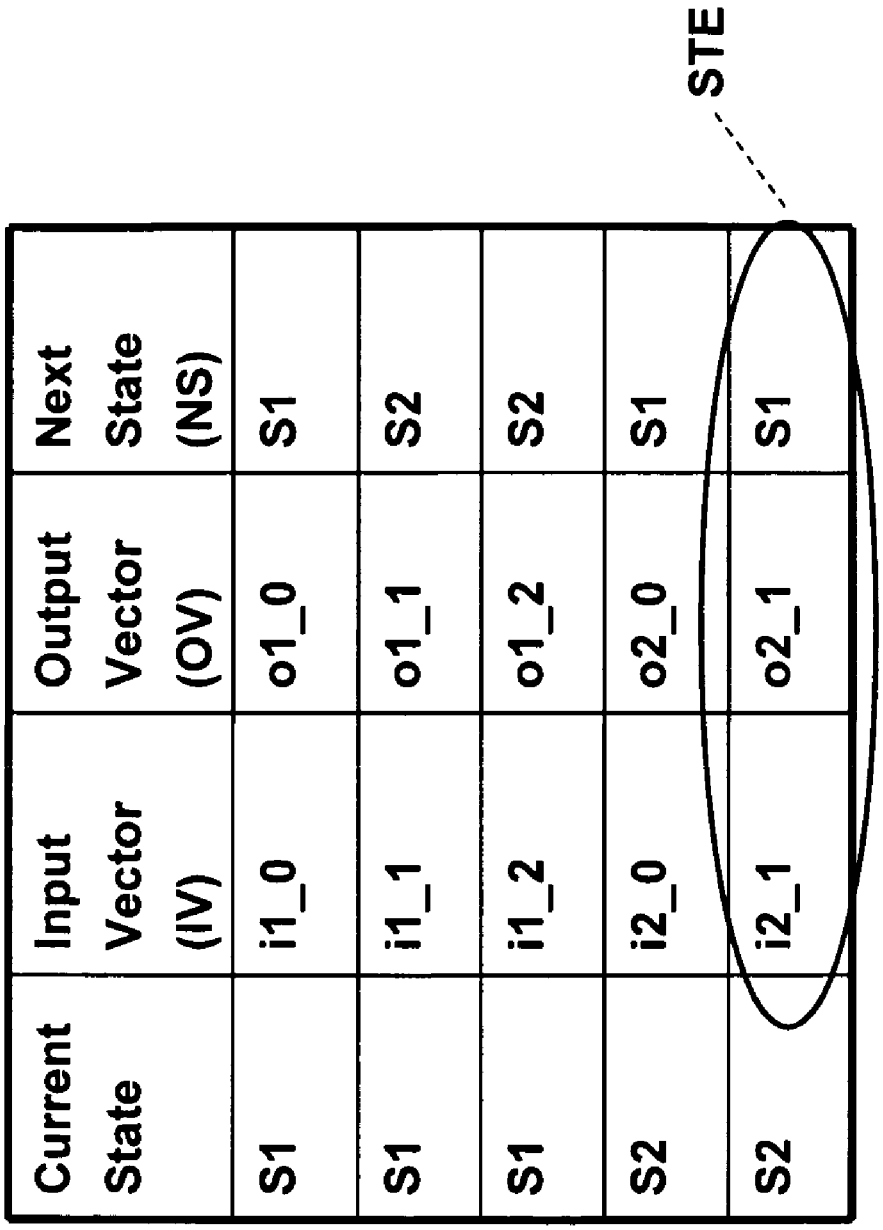
FIG. 2 illustrates a conventional state transition table of a conventional finite state machine.
Figure 3:
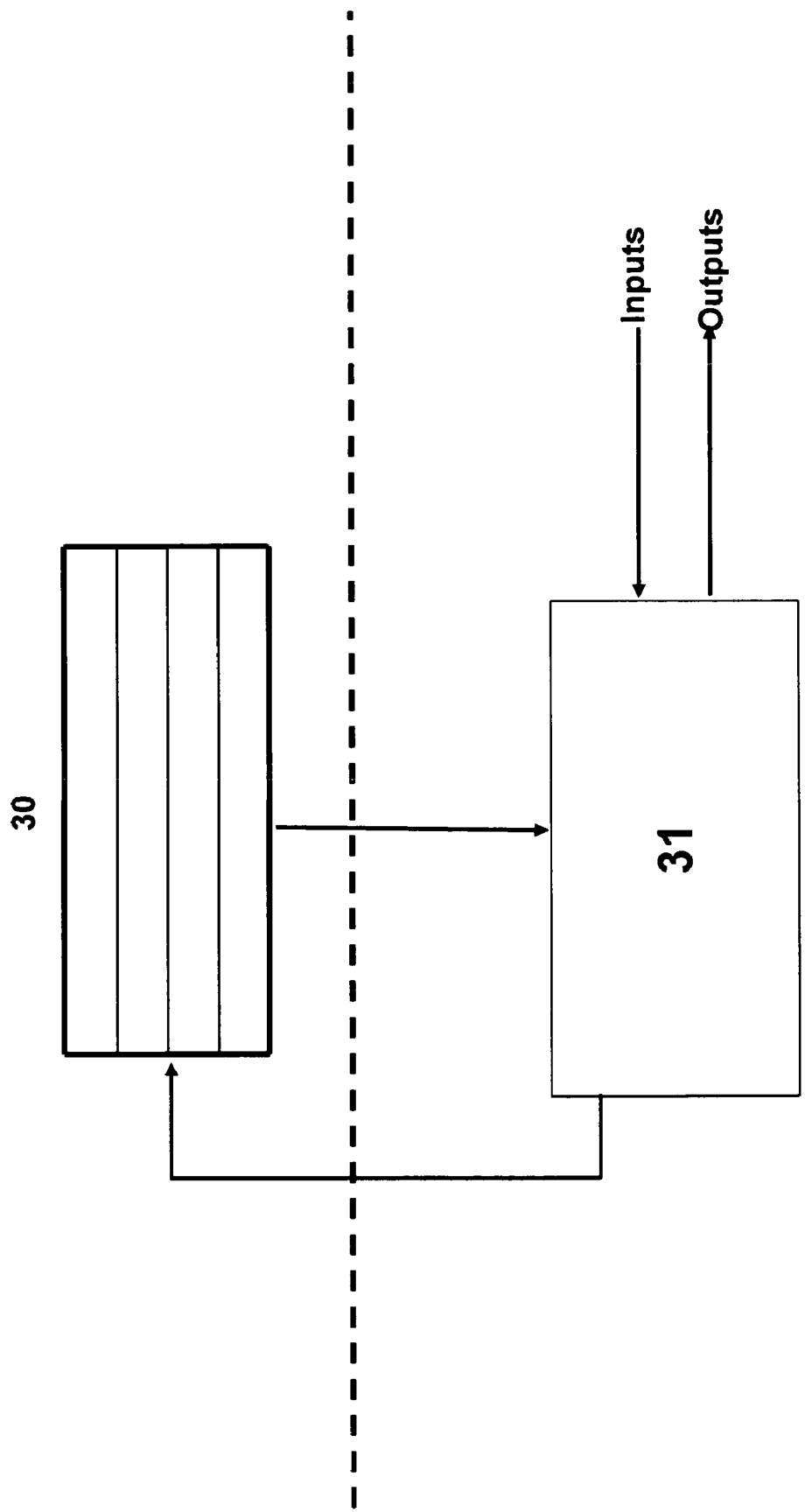
FIG. 3 illustrates a conventional programmable finite state machine.
Figure 4:
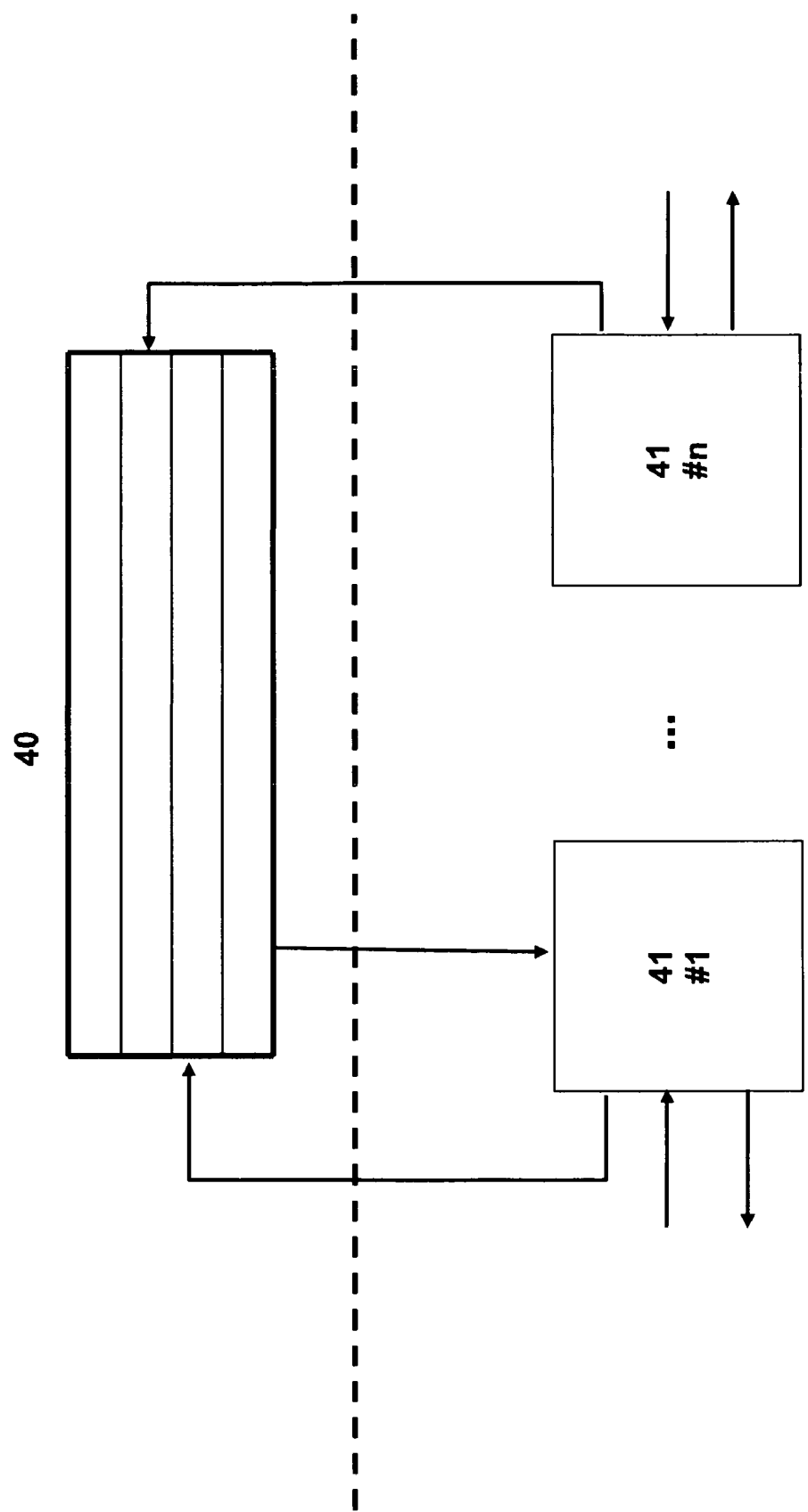
FIG. 4 illustrates a conventional arrangement of multiple programmable finite state machines utilizing a single multiport array storage unit.
Figure 5:
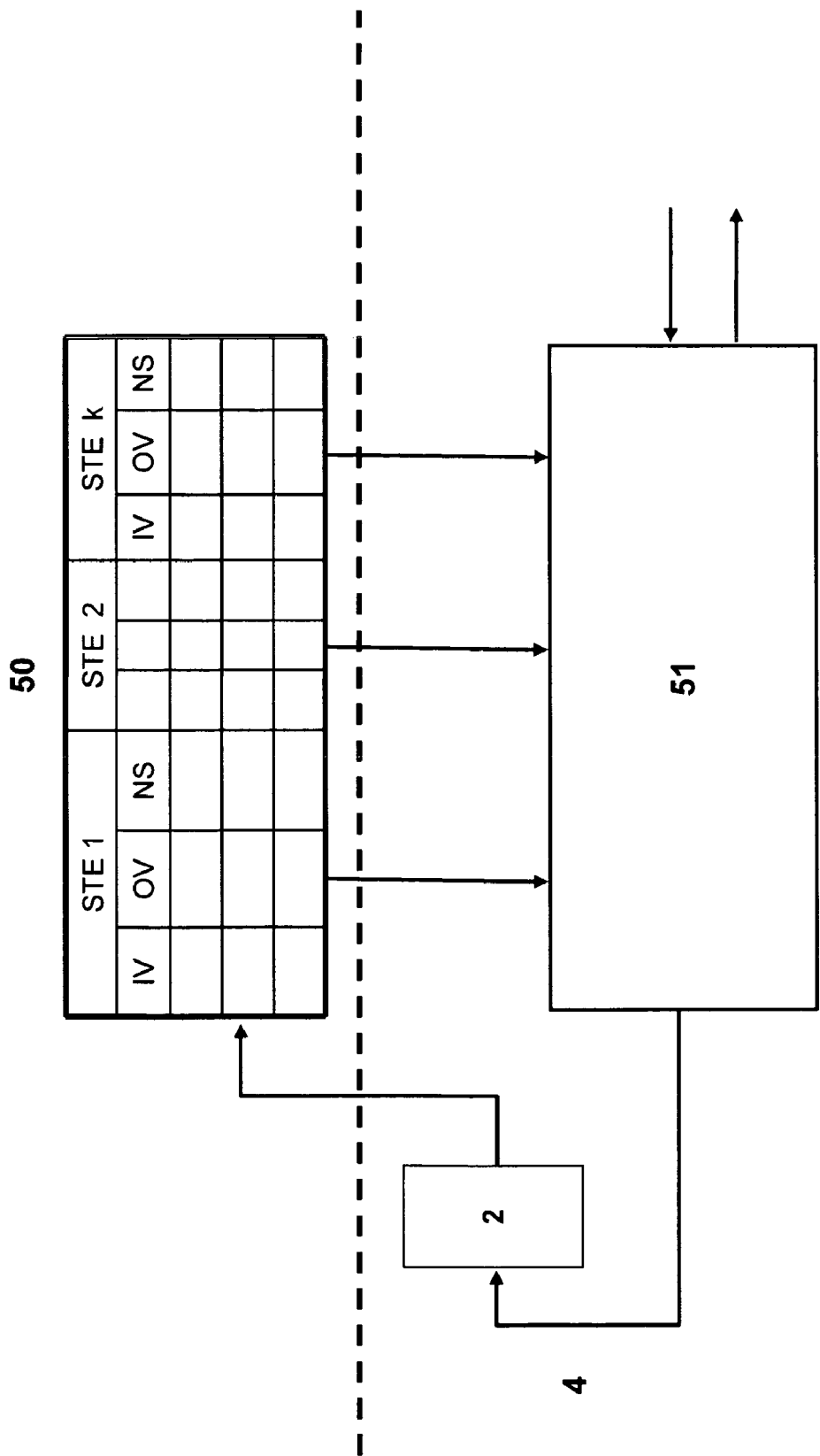
FIG. 5 illustrates a conventional single programmable finite state machine including a state transition array (STA)

Referring now to the drawings, and more particularly to FIGS. 6-13, there are shown exemplary embodiments of the structures and method according to the present invention. For descriptive and illustrative purposes only, the exemplary embodiments of the structures and method according to the present invention are illustrated with a state transition array (STA) including only one row. One of ordinary skill in the art would clearly understand that this is only illustrative in nature and would clearly expect multiple rows to be used in the implementation of the present invention.

Figure 6:
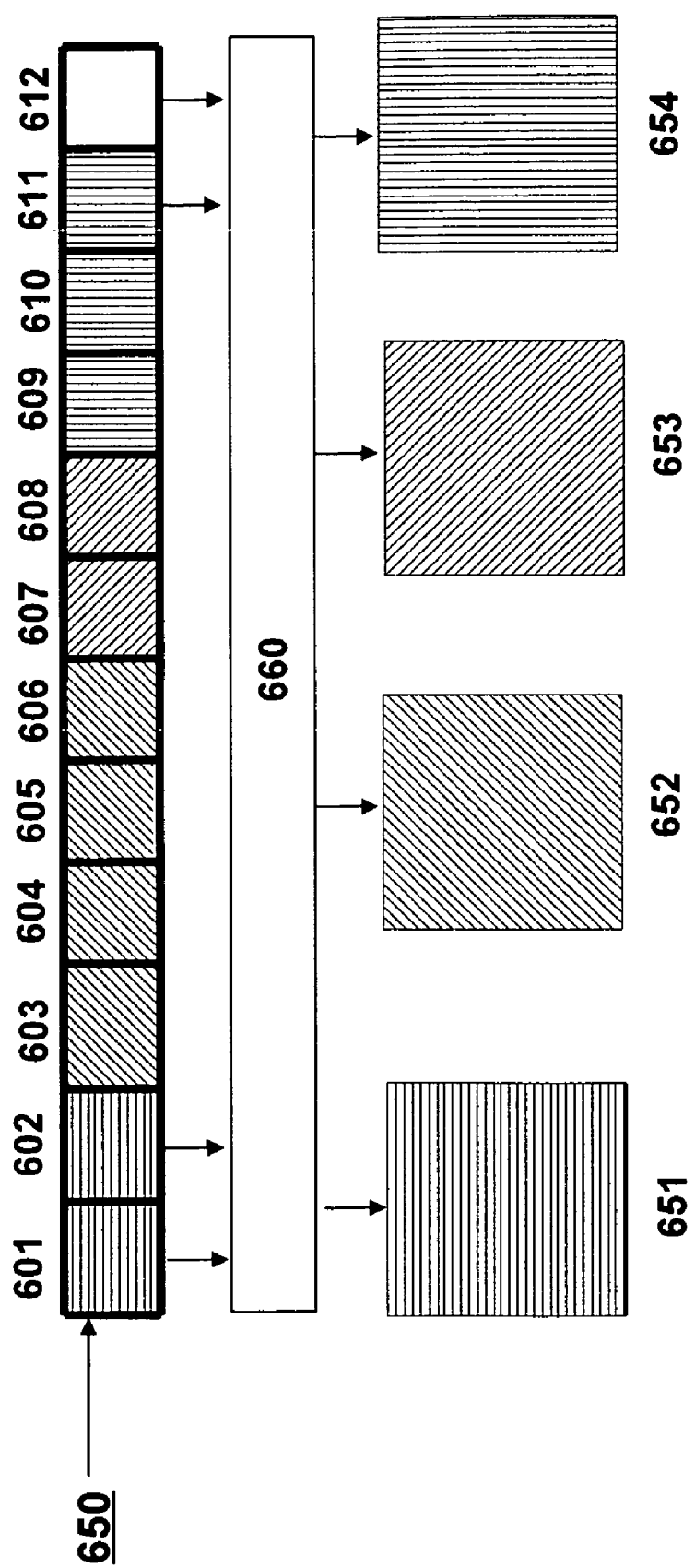
FIG. 6 illustrates an exemplary embodiment of multiple programmable finite state machines using a shared transition table of the present invention.

FIG. 6 illustrates an exemplary embodiment of multiple programmable finite state machines using a shared transition table of the present invention. The illustrated structure implements an STA 650, four finite state machine cores 651, 652, 653, and 654, respectively, and a routing network 660. State transition elements (STEs) 601 and 602 are associated with the first finite state machine core 651. STEs 603, 604, 605, and 606 are associated with the second finite state machine core 652. STEs 607 and 608 are associated with the third finite state machine core 653. STEs 609, 610, and 611 are associated with the fourth finite state machine core 654. The routing network 660 is programmed such that the above-described associations between the STEs 601, 602, 603, 604, 605, 606, 607, 608, 609, 610, and 611 and the finite state machine cores 651, 652, 653, and 654 are realized. STE 612 is not used and is a free STE.

Figure 7:
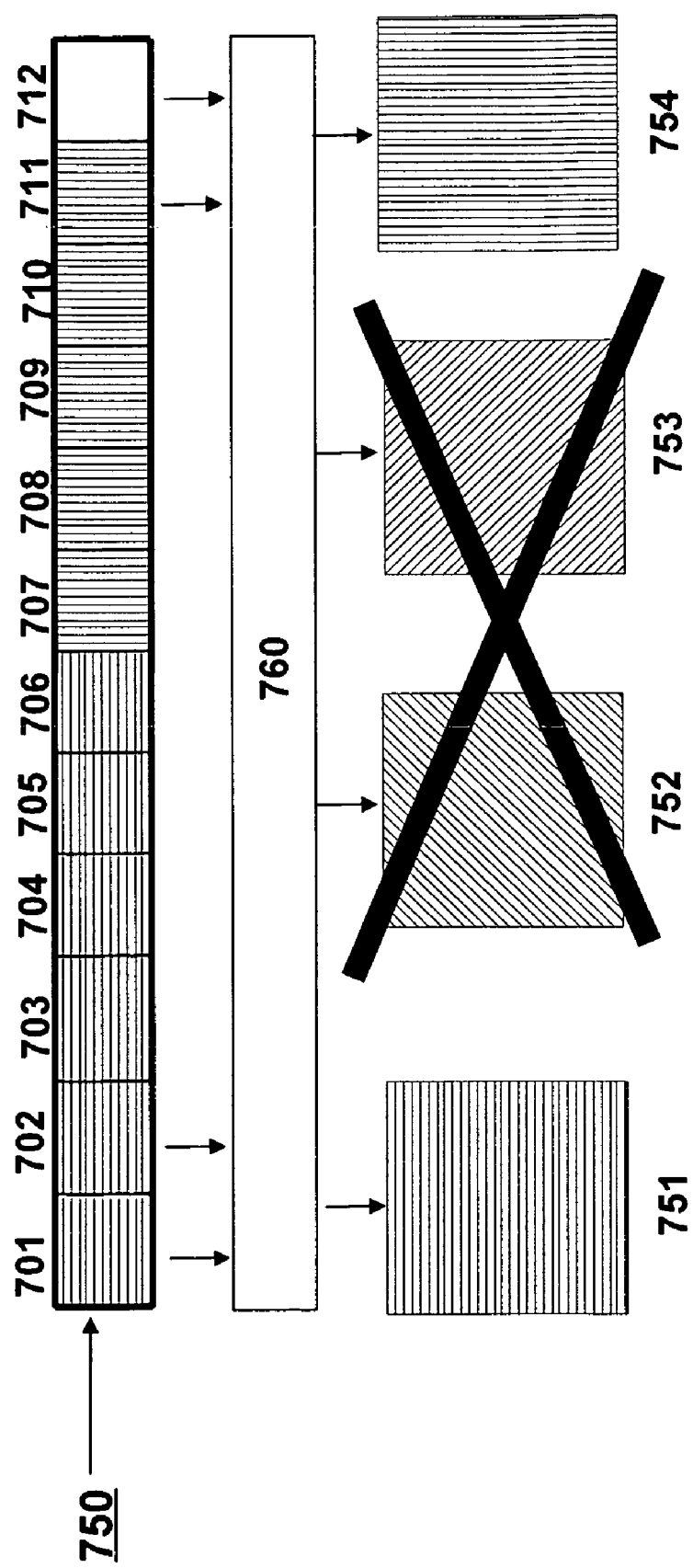
FIG. 7 illustrates an exemplary embodiment of multiple programmable finite state machines using a shared transition table of the present invention.

FIG. 7 illustrates an alternate exemplary embodiment of multiple programmable finite state machines using a shared transition table of the present invention. The illustrated structure implements an STA 750, four finite state machine cores 751, 752, 753, and 754, respectively, and a routing network 760.

The exemplary embodiment illustrated in FIG. 7 possesses a hardware structure that is the same as is illustrated in the exemplary embodiment of multiple programmable finite state machines using the shared transition table in FIG. 6. However, the exemplary embodiment illustrated in FIG. 7 only needs two of the finite state machine cores 751 and 754 to operate. In this exemplary embodiment, finite state machine cores 751 and 754 would be actively controlling data flow and would have more states and STEs than the finite state machine cores 651, 652, 653, and 654 illustrated in FIG. 6.

In FIG. 7, state transition elements (STEs) 701, 702, 703, 704, 705, and 706 are associated with the first finite state machine core 751. STEs 707, 708, 709, 710, and 711 are associated with the fourth finite state machine core 754. The routing network 760 is programmed such that the above-described associations between the STEs 701, 702, 703, 704, 705, 706, 707, 708, 709, 710, and 711 and the finite state machine cores 751 and 754 are realized. STE 712 is not used and is a free STE.

One having ordinary skill in the art would realize that FIGS. 6 and 7 are illustrations of exemplary embodiments of the present invention. For example, in practice, one of ordinary skill in the art would realize that the finite state machines illustrated in FIGS. 6 and 7 would typically have responsibility for a significantly greater amount of states (i.e., 50).

In the exemplary embodiments illustrated in FIGS. 6 and 7, a number of STEs assigned to a finite state machine core and a number of STEs assigned to a state are programmable parameters. Fixed parameters include a number of finite state machine cores implemented in the structure and a number of comparators. Finite state machine cores cannot be added or removed once the cores are built into the silicon.

An example of the application of the programmable and fixed parameters is illustrated in the comparison of FIGS. 6 and 7. In FIG. 6, four finite state machine cores 651, 652, 653, and 654 are utilized with the STA 650. If a need arises to adapt the exemplary embodiment of FIG. 6 to an application that requires two finite state machine cores instead of four finite state machine cores, the STEs in the STA would be reprogrammed to be assigned to two specific finite state machine cores, leaving the other two finite state machine cores without function for that specific application.

FIG. 7 exemplary illustrates an implementation of such a scenario. The number of finite state machine cores implemented in the exemplary embodiment of FIGS. 6 and 7 is fixed, but, by programming the STEs in the STA 750 to be assigned to only a specific two of the four implemented finite state machine cores, the number of active finite state machine cores is reduced. Thus, FIG. 7 simply represents a reprogramming of the assignments of the STEs in the STA 650 exemplarily illustrated in FIG. 6.

Figure 8:
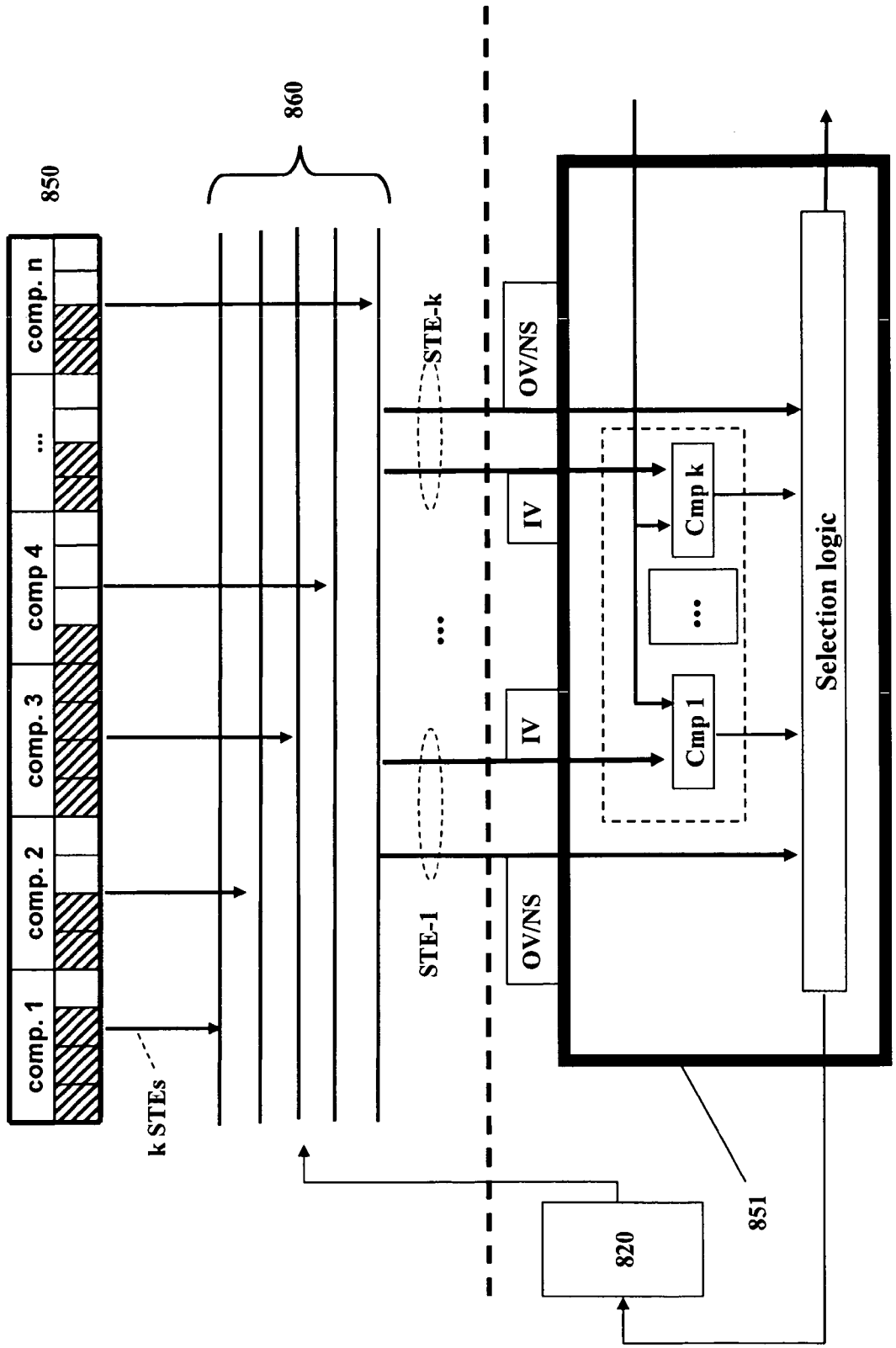
FIG. 8 illustrates an exemplary aspect of compartment routing of a programmable finite state machine using a shared transition table of the present invention.

FIG. 8 illustrates an exemplary aspect of compartment routing of a programmable finite state machine using a shared transition table of the present invention. FIG. 8 exemplarily includes a single row STA 850 and a compartmented multiplexer 860, which emulates an array and an address needed to be indexed. The current state register 820 exemplarily controls which of the compartments will be used.

A compartment has k STEs, matching the amount of k comparators in the finite state machine core 851. Neither a state nor an STE can cross a compartment boundary. Compartment 1 exemplarily contains 3 STEs, compartment 2 exemplarily contains 2 STEs, compartment 3 exemplarily contains 3 STEs, compartment 4 exemplarily contains 1 STE, and so on.

The k input vector (IV) is sent from a respective compartment to the k comparator. The selection logic decides the output vector and the next state that should be used out of k STEs that has been fed to the finite state machine core 851.

Figure 9:
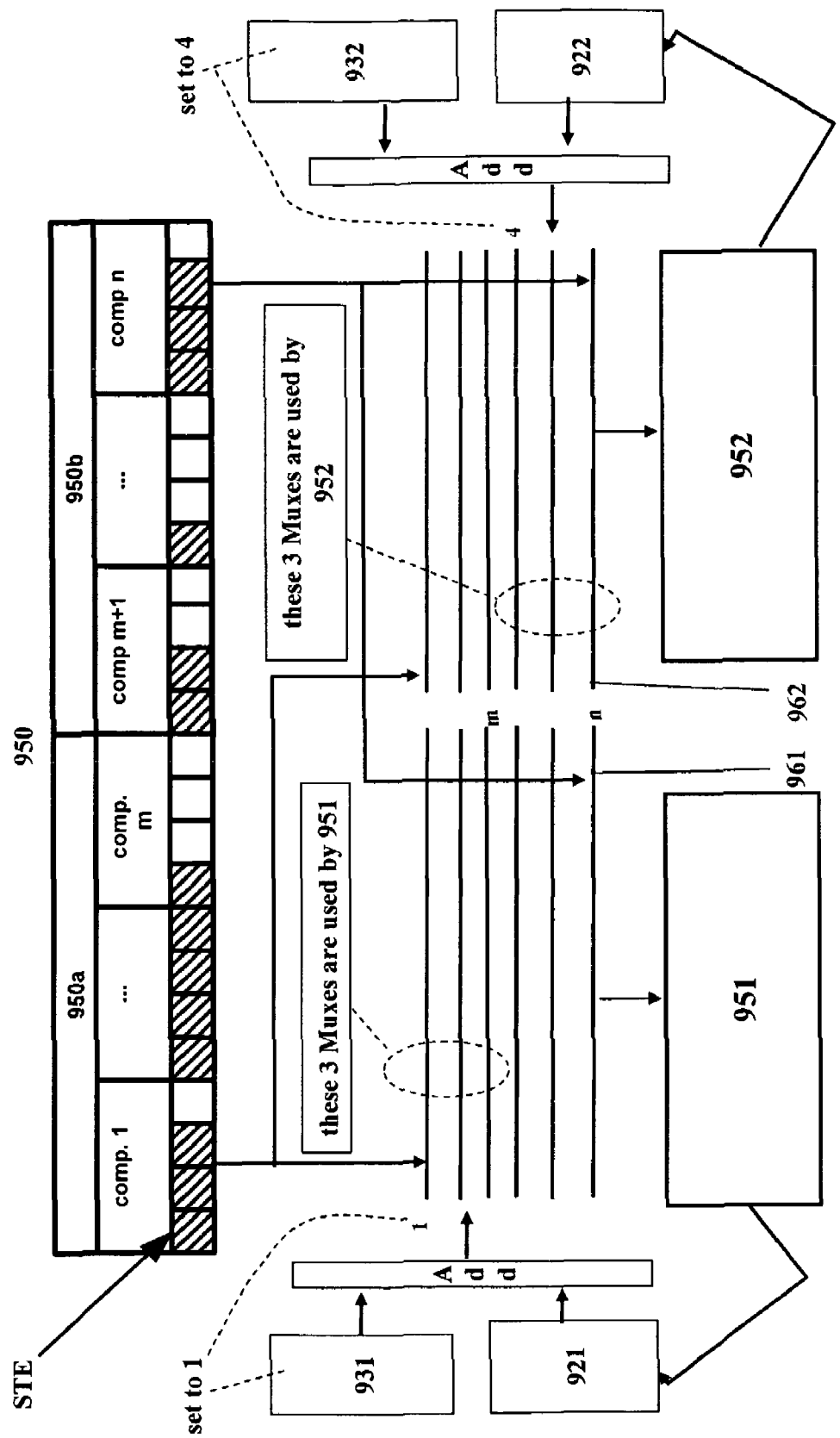
FIG. 9 illustrates an exemplary aspect of flexible allocation of STEs to finite state machine cores of a programmable finite state machine using a shared transition table of the present invention.

FIG. 9 illustrates an exemplary aspect of flexible allocation of STEs to finite state machine cores of a programmable finite state machine using a shared transition table of the present invention. In other words, it illustrates an implementation of multiple finite state machine cores 951, 952 being fed a single row STA 950. The STA 950 is split into sections 950a, 950b corresponding to the existing number of finite state machine cores 951, 952. The logic of the finite state machine cores 951, 952 is replicated. Compartmented multiplexors 961, 962 are needed respectively for each finite state machine core 951, 952. Start base addresses 931, 932 are respectively assigned such that the finite state machine cores 951, 952 respectively select the compartmented multiplexors 961, 962. Exemplarily, the start base address 931 is set to 1 and the start base address 932 is set to 4.

All compartments are connected to the corresponding mux-level of both compartmented multiplexors 961, 962. However, only some of the mux-levels of both multiplexor compartments 961, 962 are used by the finite state machine cores 951, 952. As is exemplarily illustrates on FIG. 9, multiplexor compartment 961 uses the first three mux-levels, while multiplexor compartment 962 uses the last three mux-levels. The starting mux-level is designated by the start base address value 931, 932. The offset value to the start base address value 931, 932 is exemplarily contained in the current state register 921, 922.

Sections 950a, 950b each exemplarily respectively have m and n−(m+1) compartments. There will be enough rows in the multiplexor compartments 961, 962 to accommodate the total number of compartments in sections 950a, 950b. A row is individually matched up with a compartment. The total number of rows in each multiplexor compartments 961, 962 equal n compartments of sections 950a, 950b. While each multiplexor compartment 961, 962 has n number of rows, the multiplexor compartment 961 will utilize rows 1 through m and the multiplexor compartment 962 will utilize rows m+1 through n. The usage of the rows of the multiplexor compartments 961, 962 do not overlap with each other. The start base address 931, 932 insures that no overlapping takes place and that the correct row of the multiplexor compartments 961, 962 is used. Therefore, the exemplary illustration of the multiplexor compartments 961 and 962 shows that the compartment n will be provided to an nth row of the multiplexor and is associated with the appropriate finite state machine core 951, 952.

Exemplarily, STAs have been shown as arrays with very wide single entries. However, one having ordinary skill in the art would clearly understand that all types and sizes of arrays could be implemented within the present invention. In addition, in this exemplary aspect of the present invention, two compartmented multiplexors 961, 962 are provided for two finite state machine cores 951, 952. One of ordinary skill would understand that more compartmented multiplexors and finite state machine cores could be implemented as long as the number of compartmented multiplexors equaled the number of finite state machine cores.

Figure 10:
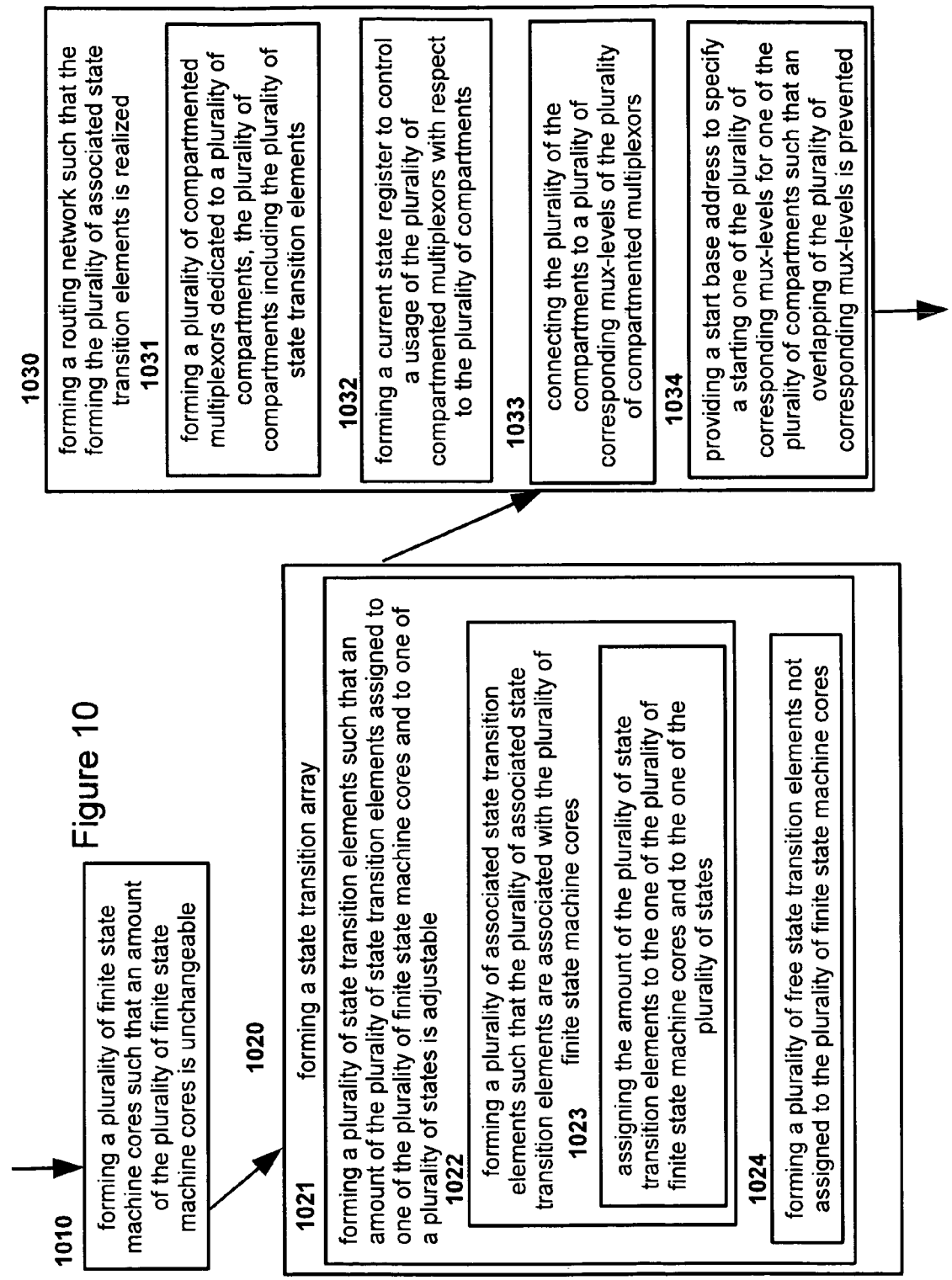
FIG. 10 illustrates an exemplary embodiment of a method of the present invention.

FIG. 10 illustrates an exemplary embodiment of a method 1000 of the present invention. A method 1000 of implementing multiple programmable finite state machines using a shared transition table includes forming (1010) a plurality of finite state machine cores such that an amount of the plurality of finite state machine cores is unchangeable, forming (1020) a state transition array, including forming (1021) a plurality of state transition elements such that an amount of the plurality of state transition elements assigned to one of the plurality of finite state machine cores and to one of a plurality of states is adjustable, the forming the plurality of state transition elements including forming (1022) a plurality of associated state transition elements such that the plurality of associated state transition elements are associated with the plurality of finite state machine cores, the forming the plurality of associated state transition elements including assigning (1023) the amount of the plurality of state transition elements to the one of the plurality of finite state machine cores and to the one of the plurality of states, and forming (1024) a plurality of free state transition elements not assigned to the plurality of finite state machine cores, and forming (1030) a routing network such that the forming the plurality of associated state transition elements is realized, the forming the routing network including forming (1031) a plurality of compartmented multiplexors dedicated to a plurality of compartments, the plurality of compartments including the plurality of state transition elements, forming (1032) a current state register to control a usage of the plurality of compartmented multiplexors with respect to the plurality of compartments, connecting (1033) the plurality of the compartments to a plurality of corresponding mux-levels of the plurality of compartmented multiplexors, and providing (1034) a start base address to specify a starting one of the plurality of corresponding mux-levels for one compartment of the plurality of compartments such that an overlapping of the plurality of corresponding mux-levels is prevented.

Figure 11:
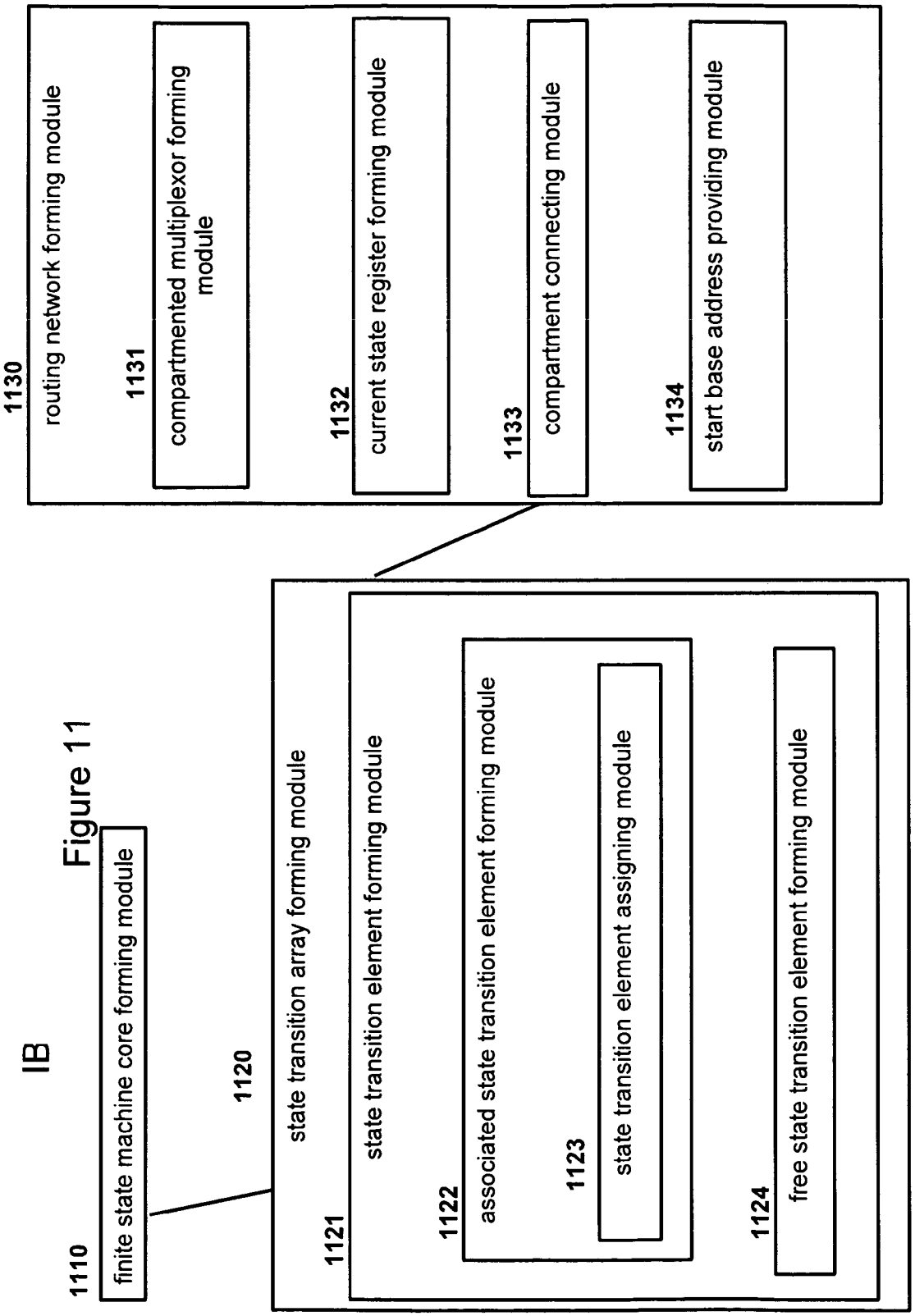
FIG. 11 illustrates an exemplary embodiment of a system of the present invention.

FIG. 11 illustrates an exemplary embodiment of a system 1100 of the present invention. A system 1100 of implementing multiple programmable finite state machines using a shared transition table includes a finite state machine core forming module (1110) for forming a plurality of finite state machine cores such that an amount of the plurality of finite state machine cores is unchangeable, a state transition array forming module (1120) for forming a state transition array, including a state transition element forming module (1121) for forming a plurality of state transition elements such that an amount of the plurality of state transition elements assigned to one of the plurality of finite state machine cores and to one of a plurality of states is adjustable, the state transition element forming module including an associated state transition element forming module (1122) for forming a plurality of associated state transition elements such that the plurality of associated state transition elements are associated with the plurality of finite state machine cores, the associated state transition element forming module including a state transition element assigning module (1123) for assigning the amount of the plurality of state transition elements to the one of the plurality of finite state machine cores and to the one of the plurality of states, and a free state transition element forming module (1124) for forming a plurality of free state transition elements not assigned to the plurality of finite state machine cores, and a routing network forming module (1130) for forming a routing network such that the associated state transition forming module is realized, the routing network forming module including a compartmented multiplexor forming module (1131) for forming a plurality of compartmented multiplexors dedicated to a plurality of compartments, the plurality of compartments including the plurality of state transition elements, a current state register forming module (1132) for forming a current state register to control a usage of the plurality of compartmented multiplexors with respect to the plurality of compartments, a compartment connecting module (1133) for connecting the plurality of the compartments to a plurality of corresponding mux-levels of the plurality of compartmented multiplexors, and a start base address providing module (1134) for providing a start base address to specify a starting one of the plurality of corresponding mux-levels for one of the plurality of compartments such that an overlapping of the plurality of corresponding mux-levels is prevented.

Figure 12:
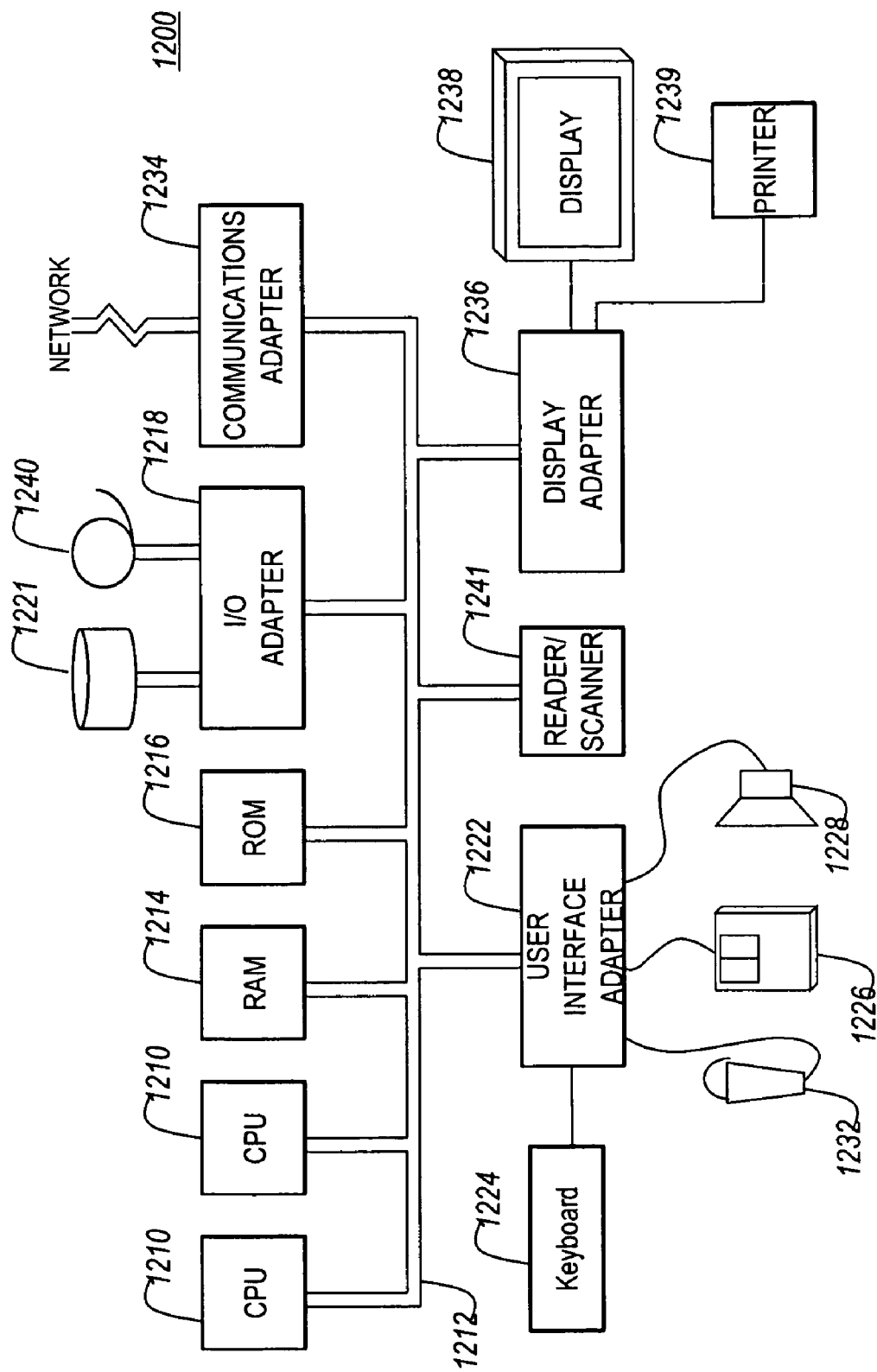
FIG. 12 illustrates an exemplary hardware configuration of an information handling/computer system for use with an exemplary embodiment of a system and method of the present invention.

FIG. 12 illustrates a typical hardware configuration of an information handling/computer system 1200 for use with the invention and which preferably has at least one processor or central processing unit (CPU) 1210.

The CPUs 1210 are interconnected via a system bus 1212 to a random access memory (RAM) 1214, read only memory (ROM) 1216, input/output (I/O) adapter 1218 (for connecting peripheral devices such as disk units 1221 and tape drives 1240 to the bus 1212), user interface adapter 1222 (for connecting a keyboard 1224, mouse 1226, speaker 1228, microphone 1232, and/or other user interface device to the bus 1212), a communication adapter 1234 for connecting an information handling system to a data processing network, the Internet, an Intranet, a personal area network (PAN), etc., reader/scanner 1241, and a display adapter 1236 for connecting the bus 1212 to a display device 1238 and/or printer 1239. An alternative preferred embodiment would include the components described above attached by intermediary devices such as bridging integrated circuit devices. Another embodiment would include these components integrated in various fashions per current state of the art architectures.

In addition to the hardware/software environment described above, a different aspect of the invention includes a computer implemented method for performing the above-described method. As an example, this method may be implemented in the particular environment discussed above.

Such a method may be implemented, for example, by operating a computer, as embodied by a digital data processing apparatus, to execute a sequence of machine readable instructions. These instructions may reside in various types of signal bearing media.

This signal bearing media may include, for example, a RAM contained within the CPU 1210, as represented by the fast access storage for example. Alternatively, the instructions may be contained in another signal bearing media, such as a magnetic data storage diskette 1300 or CD-ROM 1302 (FIG. 13), directly or indirectly accessible by the CPU 1210.

Whether contained in the diskette 1300, CD-ROM 1302, the computer/CPU 1210, or elsewhere, the instructions may be stored on a variety of machine readable data storage media, such as DASD storage (e.g., a conventional "hard drive" or a RAID array), magnetic tape, electronic read only memory (e.g., ROM, EPROM, or EEPROM), an optical storage device (e.g. CD ROM, WORM, DVD, digital optical tape, etc.), paper "punch" cards. In an illustrative embodiment of the invention, the machine readable instructions may comprise software object code, compiled from a language such as "C", etc.

Figure 13:
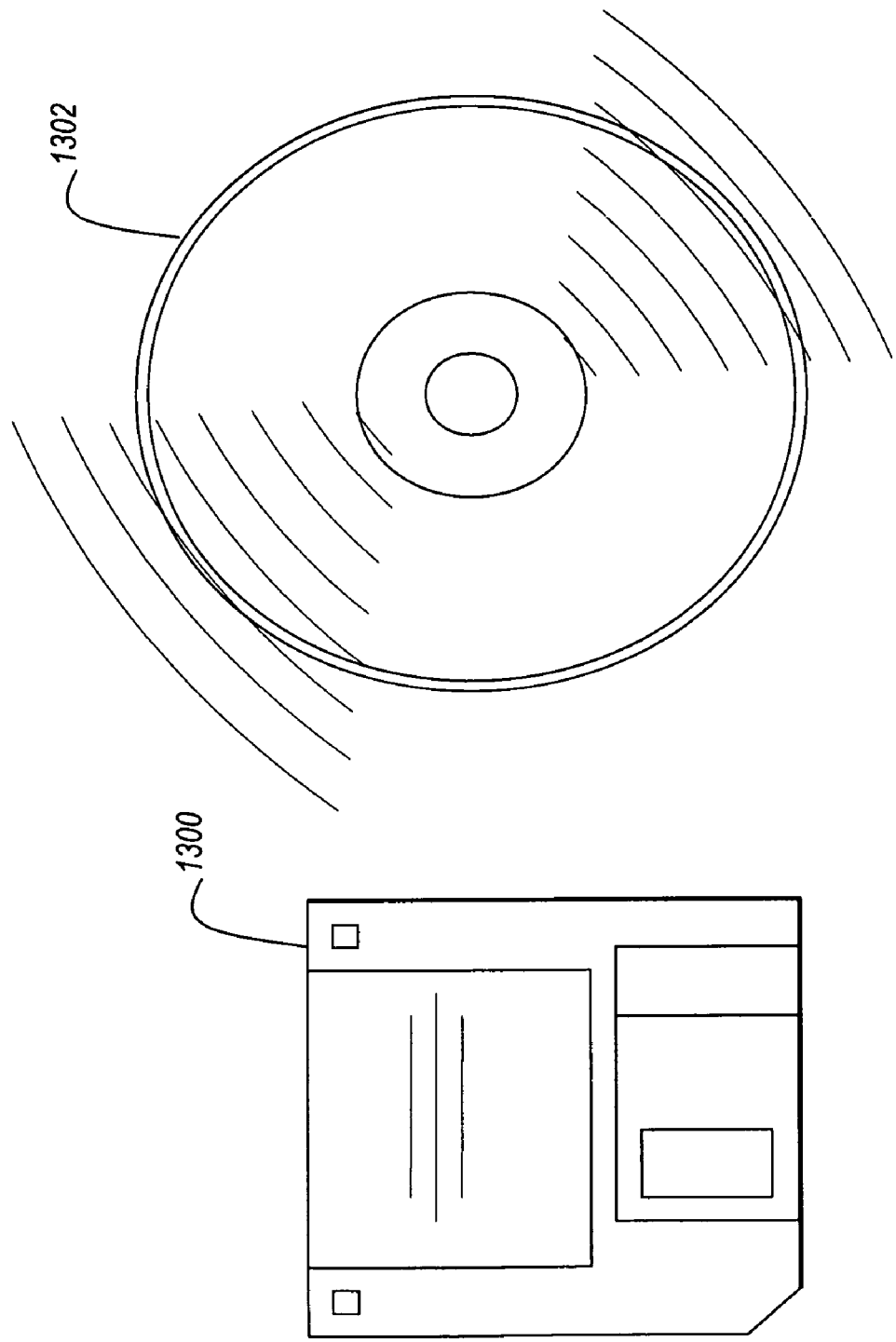
FIG. 13 illustrates a signal bearing medium and CD ROM for storing steps of a program for use with an exemplary embodiment of a system and method of the present invention.

FIG. 13 illustrates a signal bearing medium 1300 (e.g., storage medium) and CD ROM 1302 for storing steps of a program of a method according present invention.

In the description above, numerous specific details were set forth in order to provide a thorough understanding of the present invention. It will be apparent to one skilled in the art, however, that the present invention may be practiced without these specific details. In other instances, well-known circuits, control logic, and the details of computer program instructions for conventional algorithms and processes have not been shown in detail in order not to obscure the present invention unnecessarily.

Software programming code that embodies aspects of the present invention is typically maintained in permanent storage, such as a computer readable medium. In a client-server environment, such software programming code may be stored on a client or server. The software programming code may be embodied on any of a variety of known media for use with a data processing system. This includes, but is not limited to, magnetic and optical storage devices such as disk drives, magnetic tape, compact discs (CD's), digital video discs (DVD's), and computer instruction signals embodied in a transmission medium with or without a carrier wave upon which the signals are modulated. For example, the transmission medium may include a communications network, such as the Internet. In addition, while the invention may be embodied in computer software, the functions necessary to implement the invention may alternatively be embodied in part or in whole using hardware components such as application-specific integrated circuits or other hardware, or some combination of hardware components and software.

Improvements and modifications can be made to the foregoing without departing from the scope of the present invention.

It will be appreciated by persons skilled in the art that the present invention is not limited to what has been particularly shown and described hereinabove. Rather, the scope of the present invention includes both combinations and sub-combinations of the various features described hereinabove, as well as variations and modifications thereof that are not in the prior art, which would occur to persons skilled in the art upon reading the foregoing description.

What is claimed is:

1. A method of implementing multiple programmable finite state machines using a shared transition table, said method comprising:

forming a plurality of finite state machine cores such that an amount of said plurality of finite state machine cores is unchangeable;

forming a state transition array, comprising:

forming a plurality of state transition elements such that an amount of said plurality of state transition elements assigned to one of said plurality of finite state machine cores and to one of a plurality of states is adjustable, said forming said plurality of state transition elements comprising:

forming a plurality of associated state transition elements such that said plurality of associated state transition elements is associated with said plurality of finite state machine cores, said forming said plurality of associated state transition elements comprising assigning said amount of said plurality of state transition elements to said one of said plurality of finite state machine cores and to said one of said plurality of states; and forming a plurality of free state transition elements not assigned to said plurality of finite state machine cores; and forming a routing network such that said forming said plurality of associated state transition elements is realized, said forming said routing network comprising:

forming a plurality of compartmented multiplexors dedicated to a plurality of compartments, said plurality of compartments comprising said plurality of state transition elements;

forming a current state register to control a usage of said plurality of compartmented multiplexors with respect to said plurality of compartments;

connecting said plurality of said compartments to a plurality of corresponding mux-levels of said plurality of compartmented multiplexors; and providing a start base address to specify a starting one of said plurality of corresponding mux-levels for one of said plurality of compartments such that an overlapping of said plurality of corresponding mux-levels is prevented, wherein said amount of said plurality of finite state machine cores is equal to or greater than a number of said plurality of finite state machine cores associated with said plurality of associated state transition elements, wherein said one of said plurality of compartments has a number of state transition elements that is equal to a number of comparators in a finite state machine core associated with said one of said plurality of compartments, wherein an amount of said plurality of compartmented multiplexors equals said amount of said plurality of finite state machine cores, wherein a number of said plurality of corresponding mux-levels in an entirety of said plurality of compartmented multiplexors is not utilized, and wherein said plurality of corresponding mux-levels is utilized in at least one of said compartmented multiplexors.

* * * * *